(12) United States Patent
Fox

(10) Patent No.: US 11,680,450 B2
(45) Date of Patent: Jun. 20, 2023

(54) INDUCTIVE DATA TRANSMISSION SYSTEM FOR DRILL PIPE

(71) Applicant: Joe Fox, Spanish Fork, UT (US)

(72) Inventor: Joe Fox, Spanish Fork, UT (US)

( * ) Notice: Subject to any disclaimer, the term of this patent is extended or adjusted under 35 U.S.C. 154(b) by 0 days.

(21) Appl. No.: 17/543,655

(22) Filed: Dec. 6, 2021

(65) Prior Publication Data

US 2022/0098933 A1   Mar. 31, 2022

(51) Int. Cl.
*E21B 47/13*   (2012.01)
*E21B 17/02*   (2006.01)

(52) U.S. Cl.
CPC .......... *E21B 17/0283* (2020.05); *E21B 47/13* (2020.05)

(58) Field of Classification Search
CPC ............. E21B 17/0283; E21B 17/0285; E21B 17/028; E21B 17/02; E21B 17/03; E21B 47/13; E21B 47/12; E21B 47/138
See application file for complete search history.

(56) References Cited

U.S. PATENT DOCUMENTS

| | | | |
|---|---|---|---|
| 6,717,501 B2* | 4/2004 | Hall ........................ | E21B 47/13 336/15 |
| 10,612,318 B2* | 4/2020 | Wall ...................... | E21B 17/003 |
| 10,767,422 B2* | 9/2020 | Partouche ............. | E21B 17/046 |
| 11,033,958 B2* | 6/2021 | Imaoka .................. | C22C 33/02 |
| 2021/0101257 A1* | 4/2021 | Khan ....................... | B24C 3/06 |

* cited by examiner

*Primary Examiner* — Tarun Sinha
*Assistant Examiner* — James I Burris

(57) ABSTRACT

A drill string comprising connectable drill pipes. The drill pipes comprise loadable annular shoulders within their pin end and box end tool joints, each having an annular groove therein. The walls of the annular groove may comprise a region harder than the surrounding annular shoulder. An annular channel may be disposed within the annular groove, and a wire coil may be arranged within the annular channel. The annular channel may be comprised of a magnetically conductive electrically insulating (MCEI) soft magnetic material suitable for reducing the signal loss across inductively coupled channels of adjacent connected drill pipes. The MCEI material may comprise manganese and iron sub-micron particles. The annular channel may comprise orifices. An insert may be positioned between the annular channel and the walls of the groove. The insert may be harder than the walls of the groove.

20 Claims, 15 Drawing Sheets

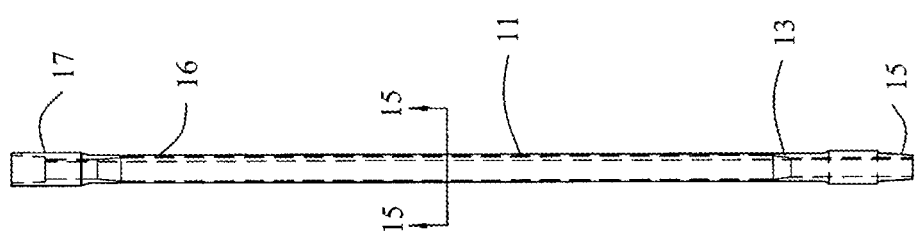
(Prior Art) FIG. 5
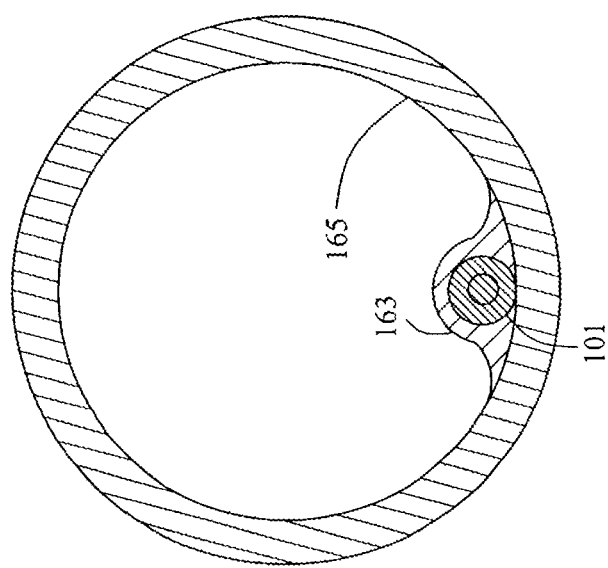
(Prior Art) FIG. 19

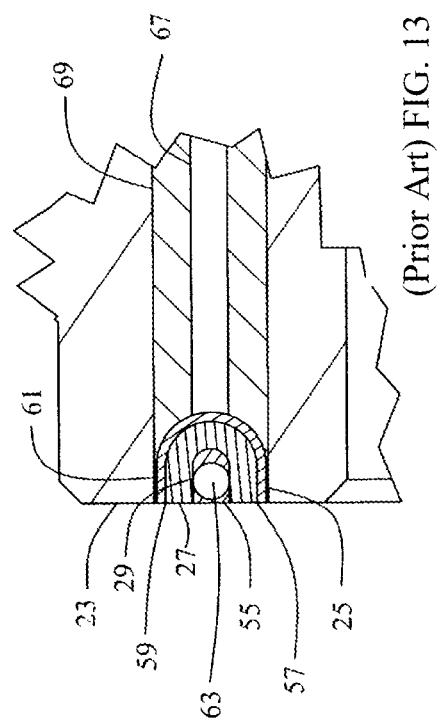
(Prior Art) FIG. 13
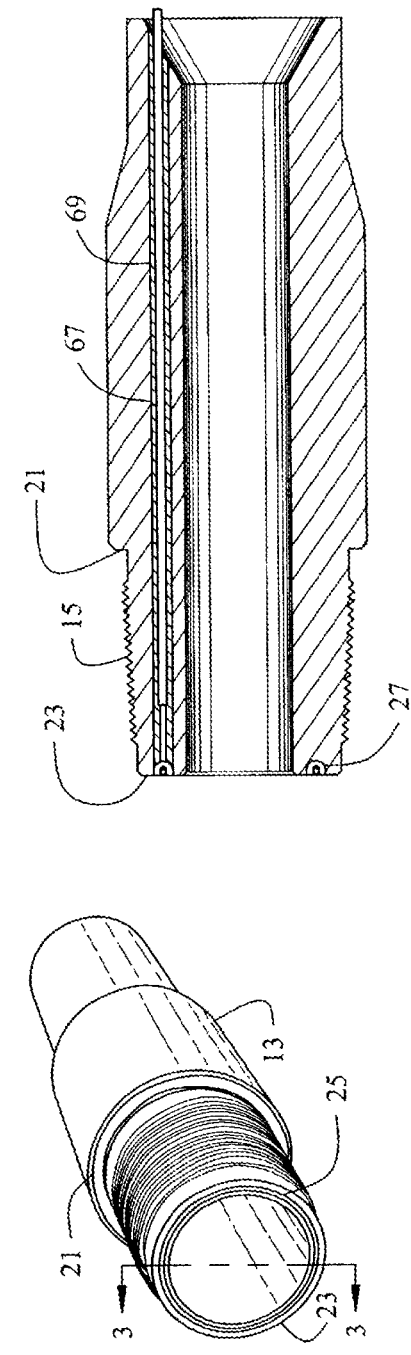
(Prior Art) FIG. 7
(Prior Art) FIG. 6

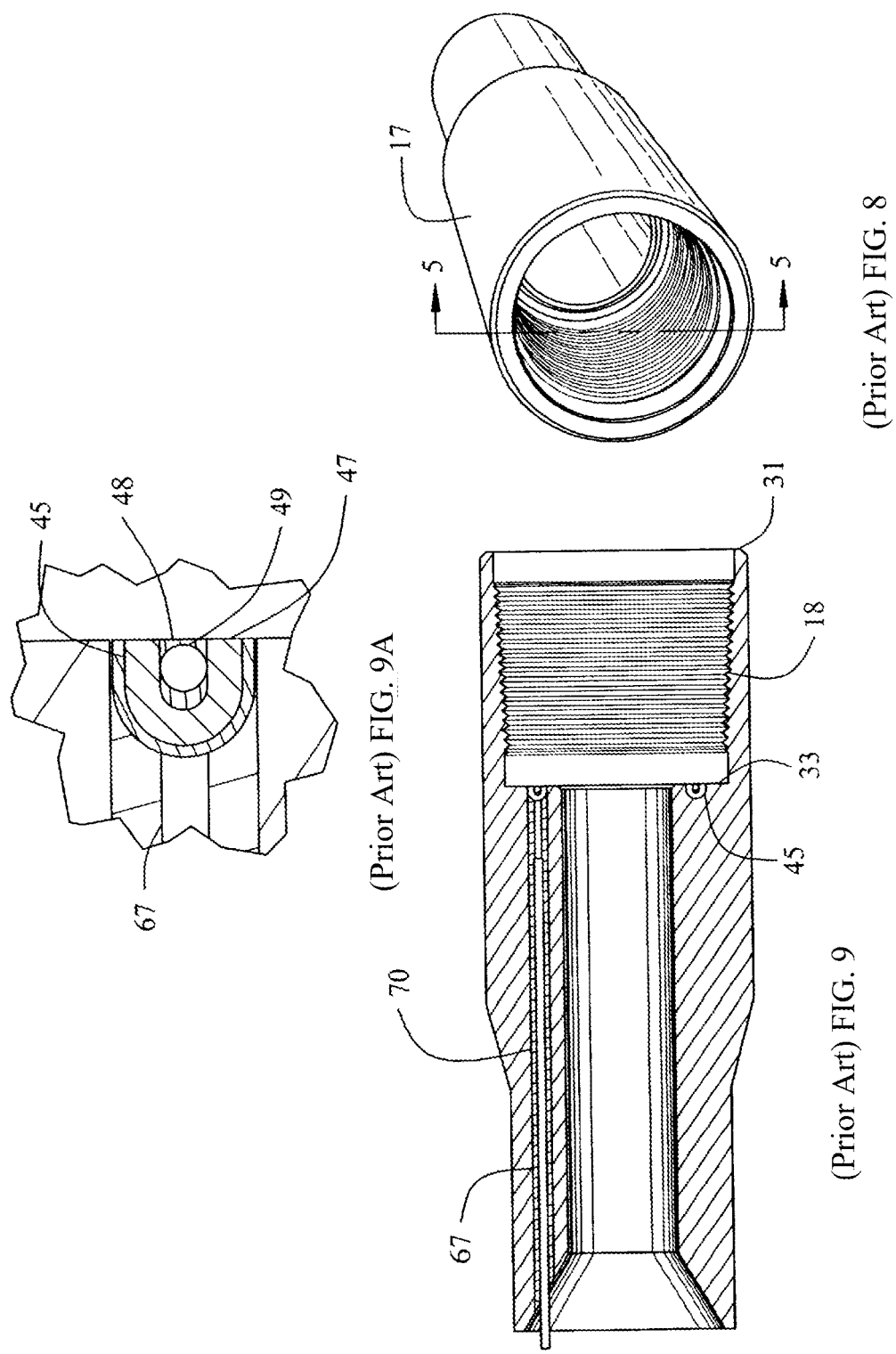

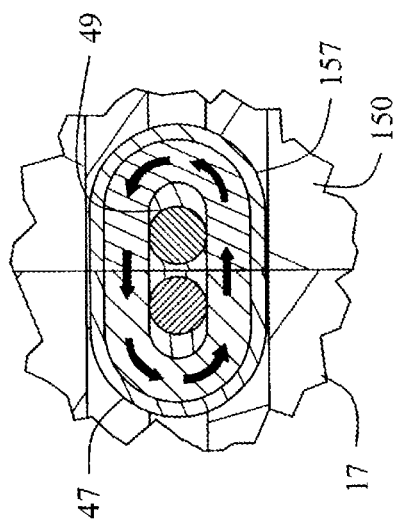
(Prior Art) FIG. 21
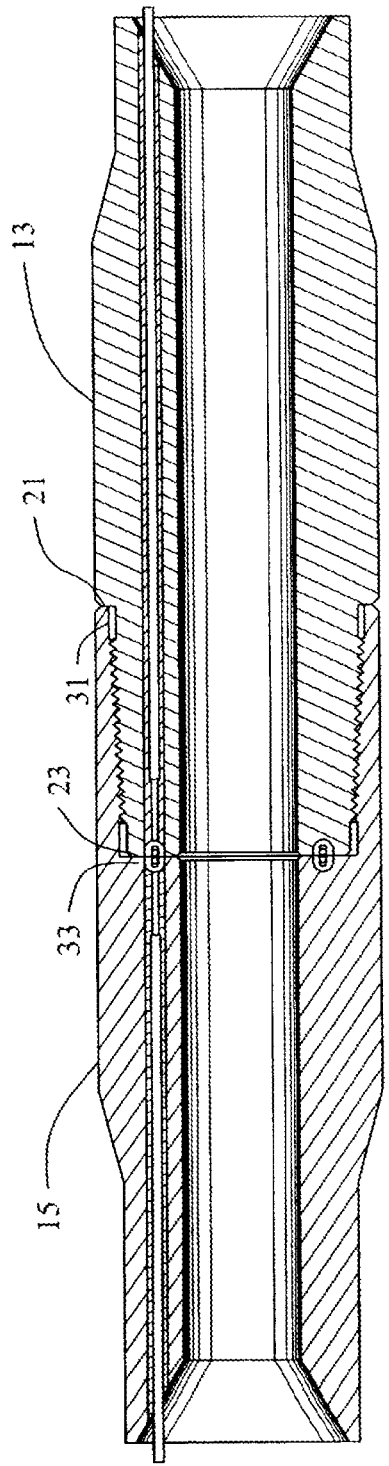
(Prior Art) FIG. 10

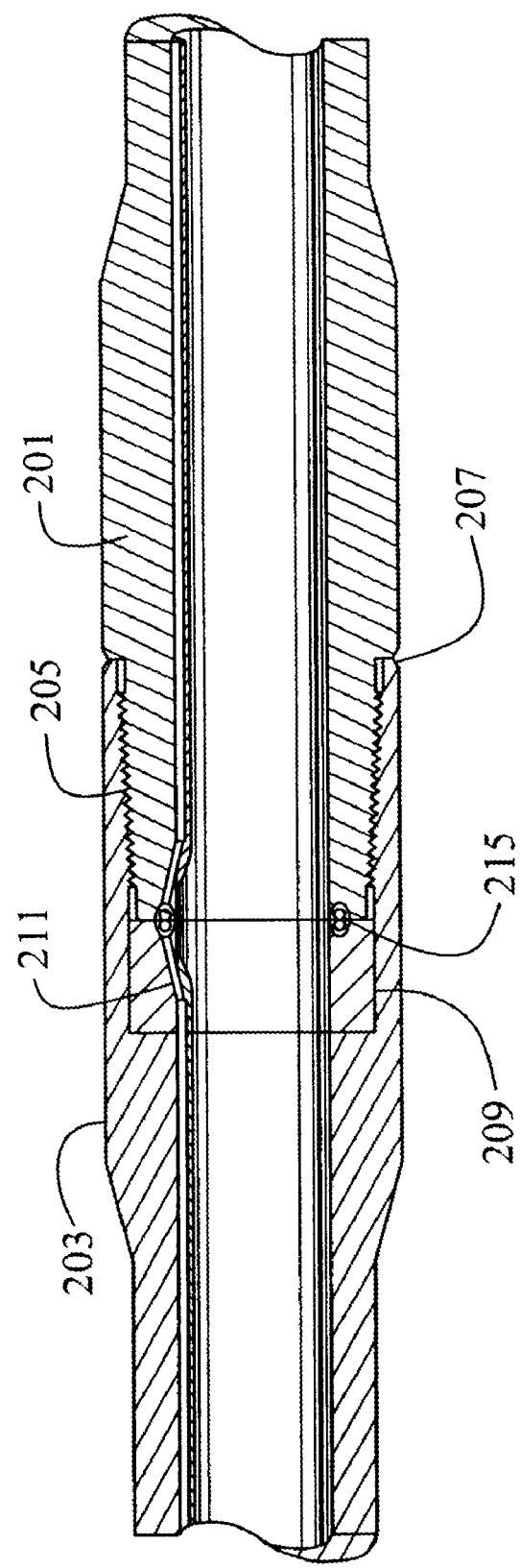
(Prior Art) FIG. 11

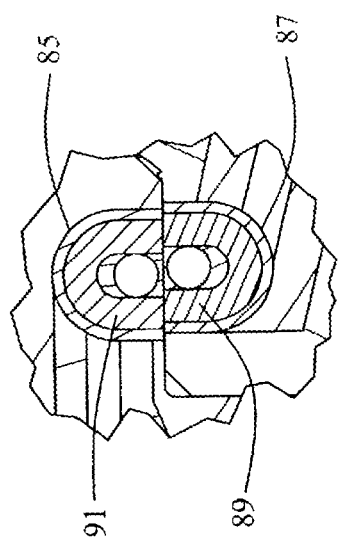
(Prior Art) FIG. 12A
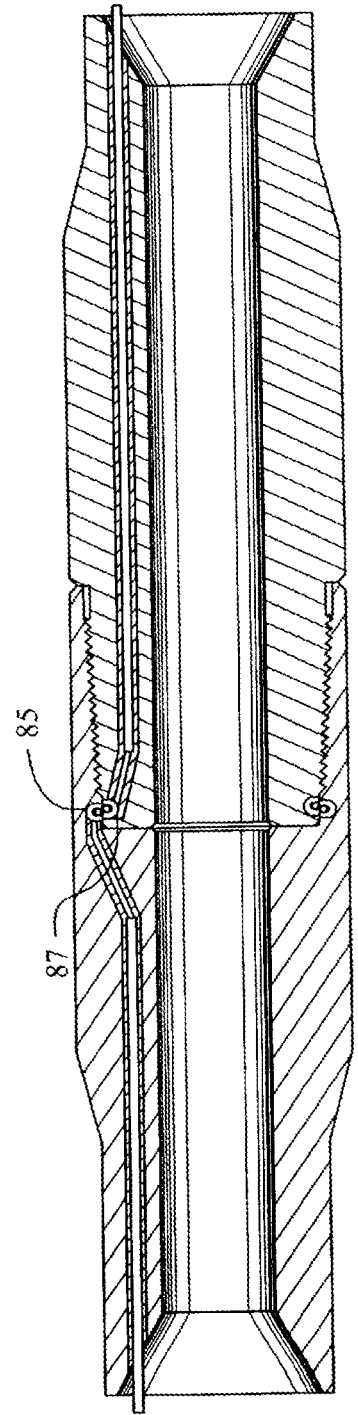
(Prior Art) FIG. 12

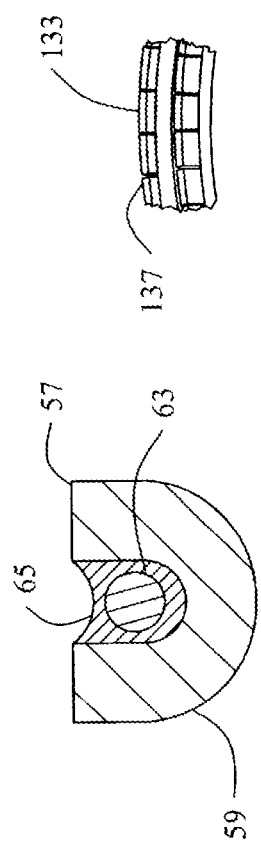
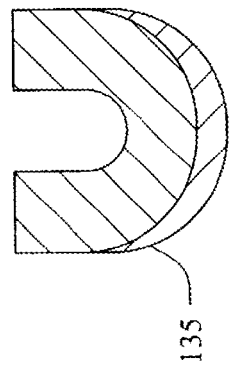
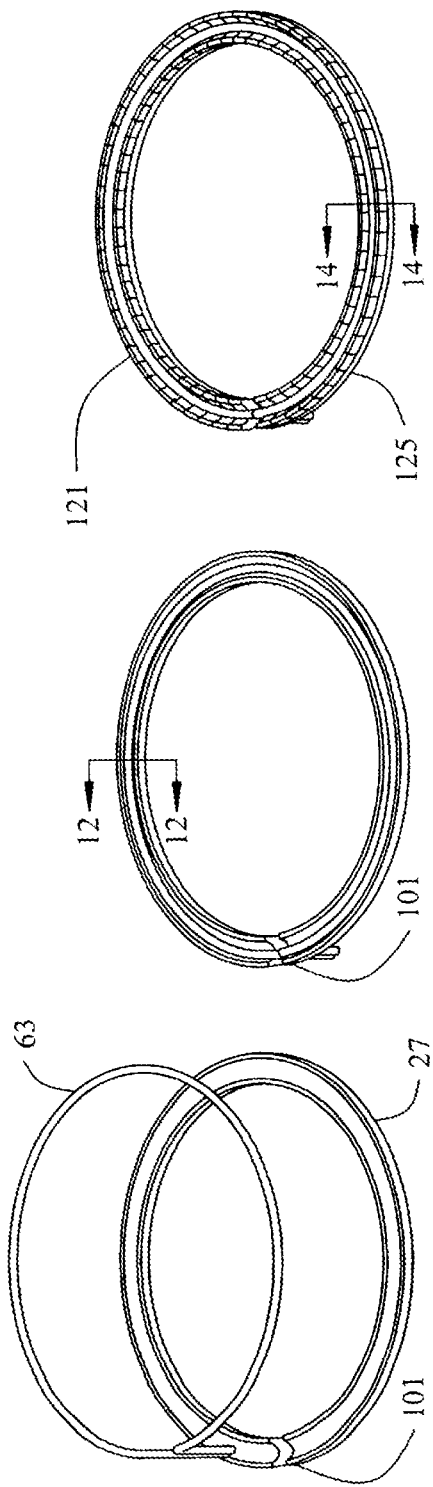
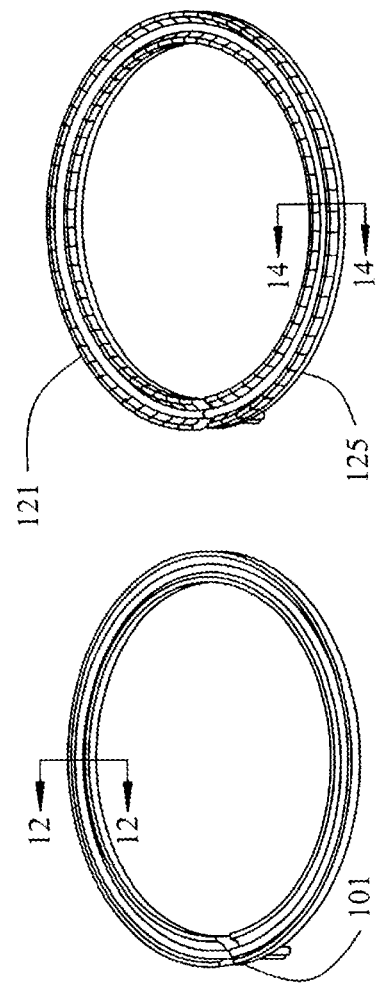

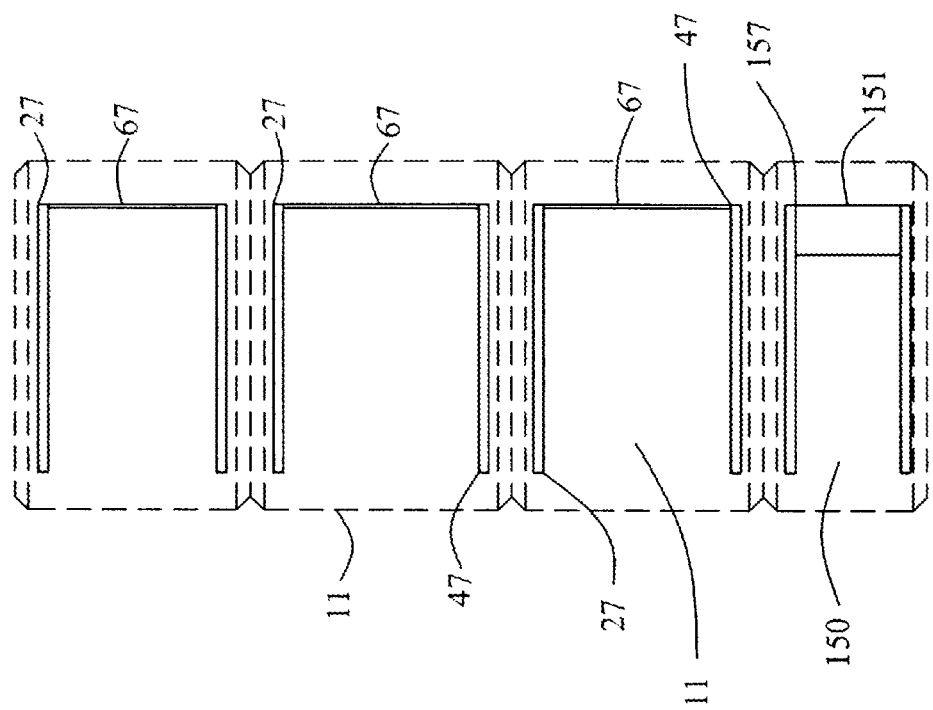
(Prior Art) FIG. 20

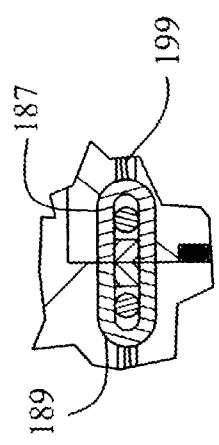
(Prior Art) FIG. 22A
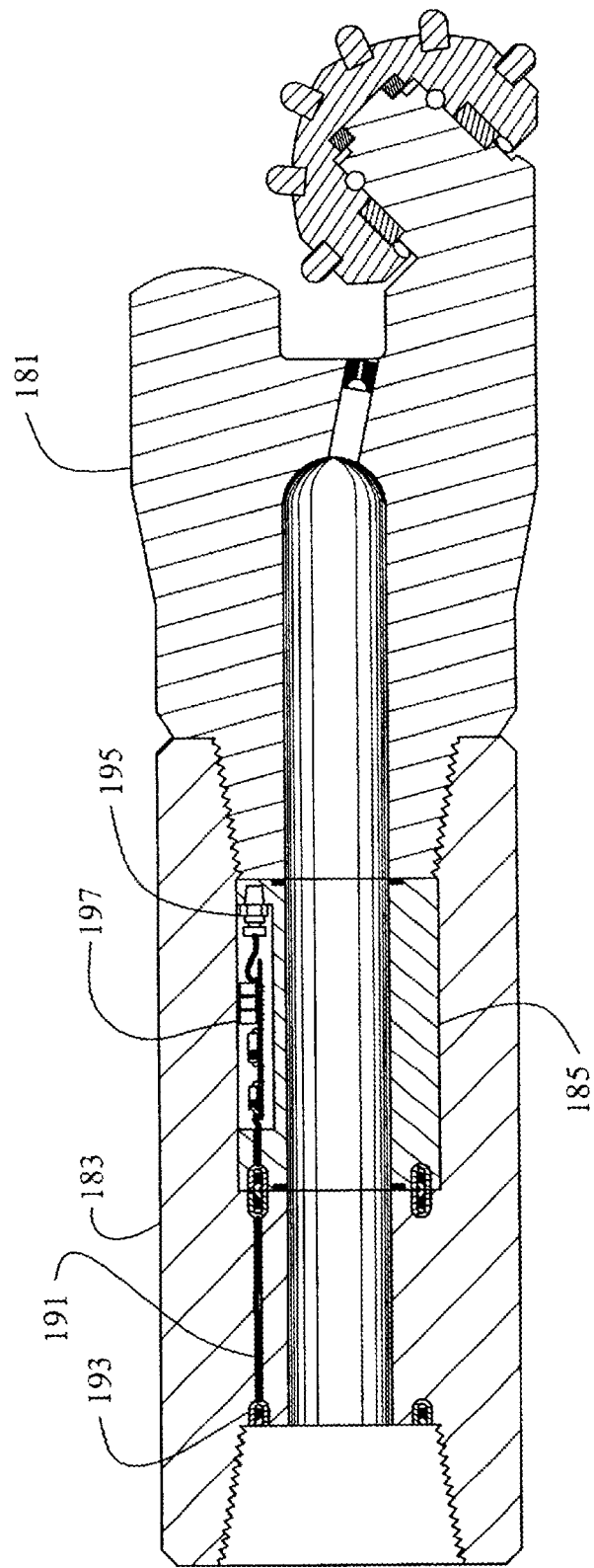
(Prior Art) FIG. 22

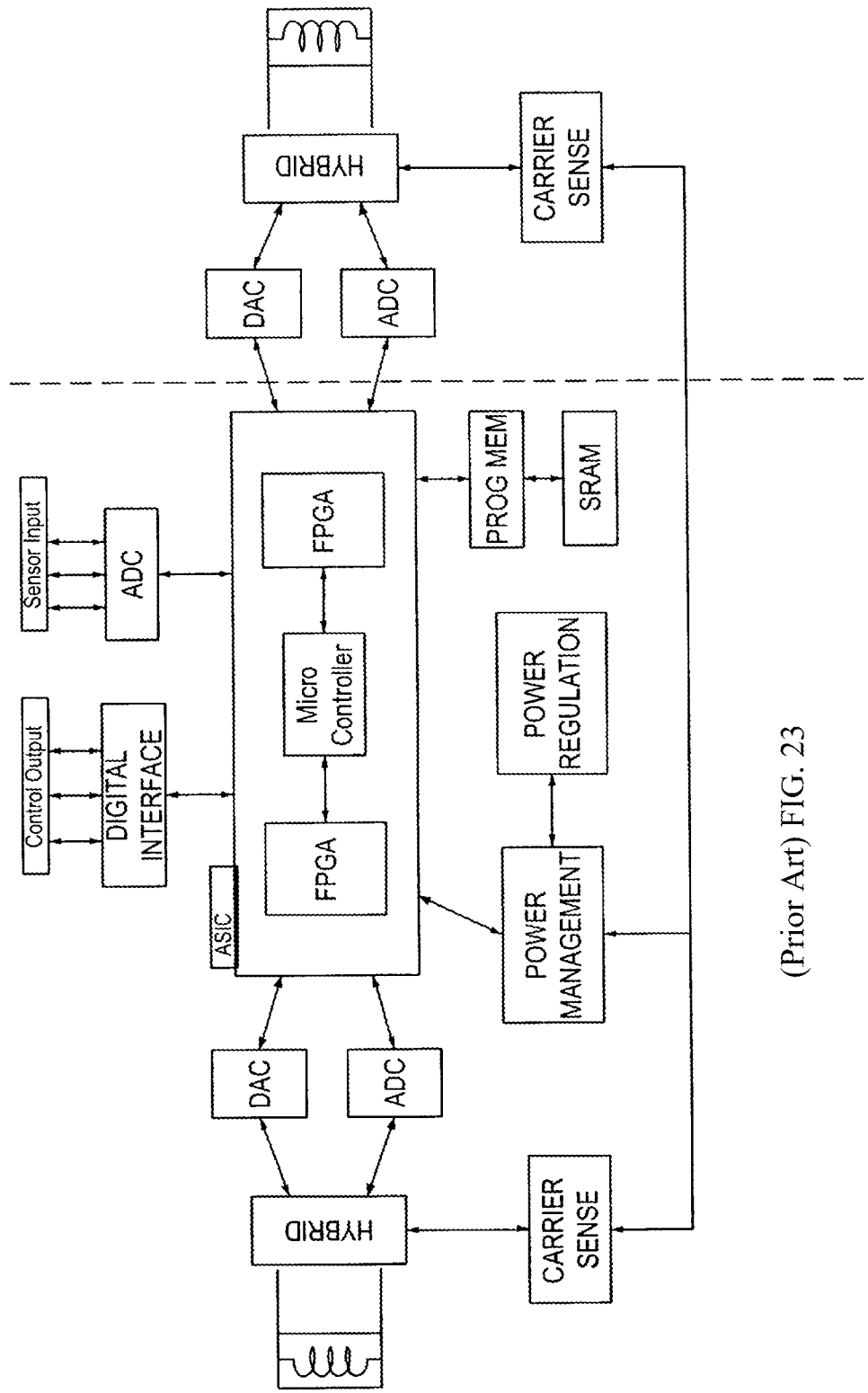
(Prior Art) FIG. 23

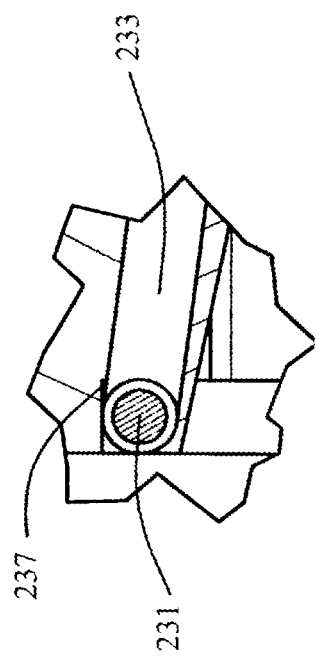
(Prior Art) FIG. 24A
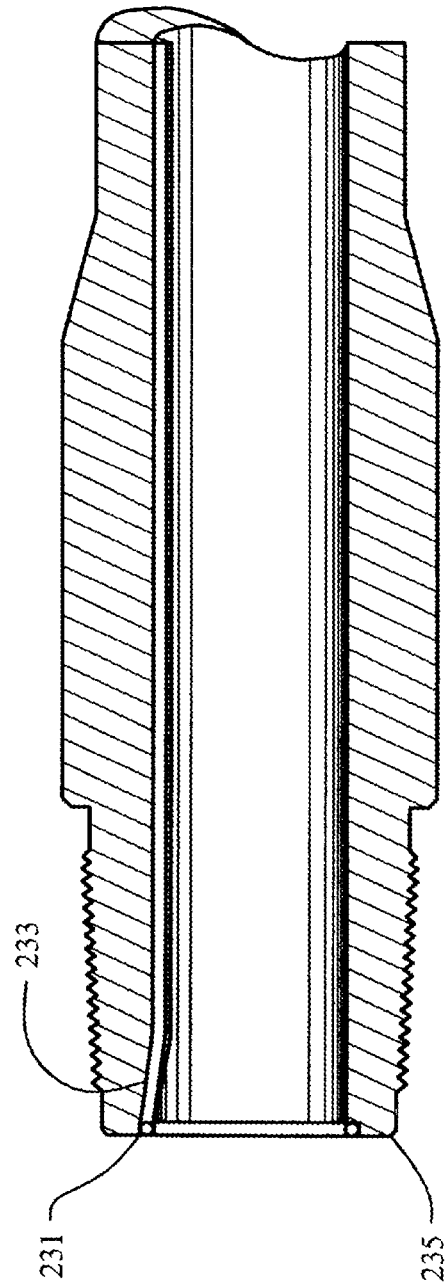
(Prior Art) FIG. 24

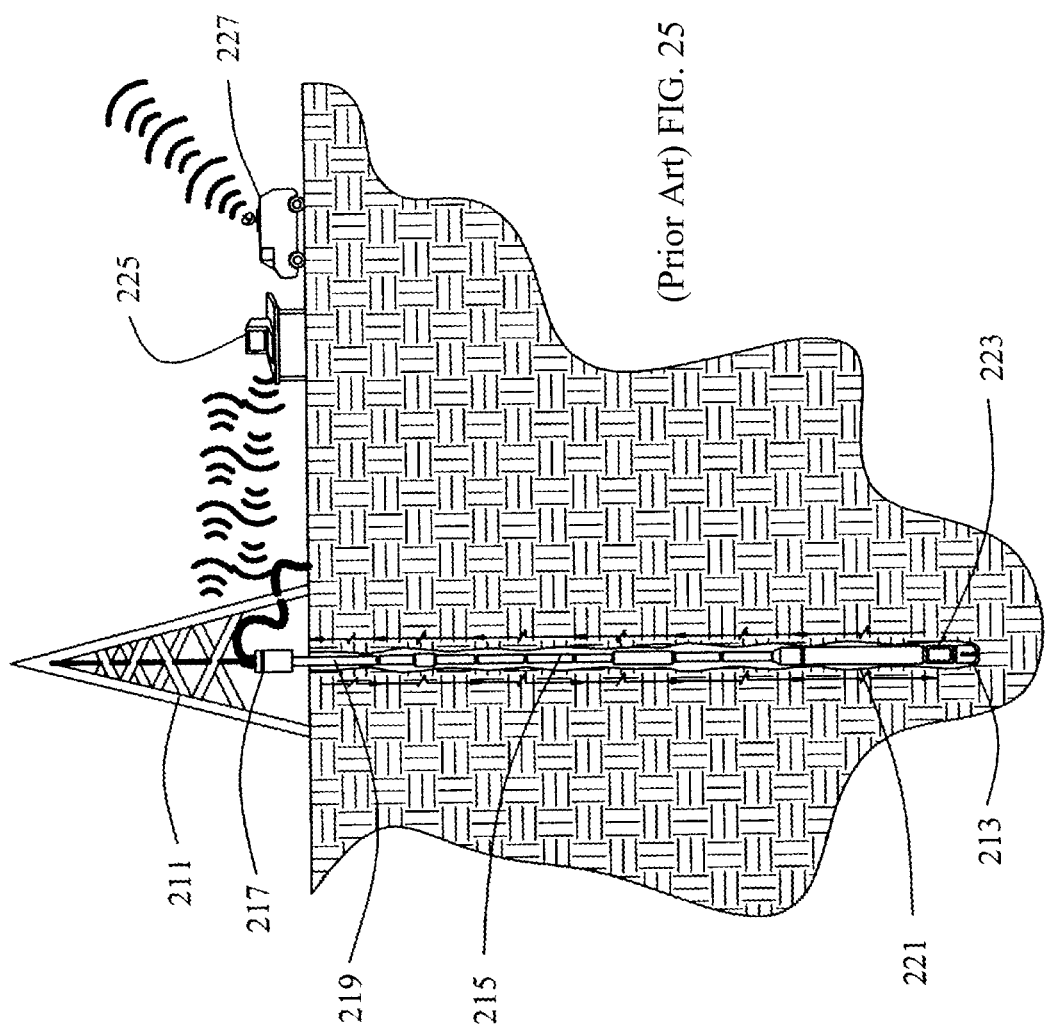
(Prior Art) FIG. 25

INDUCTIVE DATA TRANSMISSION SYSTEM FOR DRILL PIPE

This disclosure draws upon the following patents: U.S. Pat. No. 11,033,958, to Imaoka, et al., issued Jun. 15, 2021; U.S. Pat. No. 6,717,501, to Hall, et al., issued Apr. 6, 2004; U.S. Pat. No. 10,767,422, to Partouche, issued Sep. 8, 2020; and U.S. Pat. No. 10,612,318, to Wall, et al., issued Apr. 7, 2020. These patents are each incorporated herein in their entirety by these references. The prior art figures and related text presented in this disclosure are largely taken from said patents.

BACKGROUND OF THE INVENTION

The present invention relates to the field of data transmission systems, particularly data transmission systems suitable for use in downhole environments, such as along a drill string used in oil and gas exploration, or along the casings and other equipment used in oil and gas production.

The goal of accessing data from a drill string with high efficiency and reliability has been expressed since the early days of well construction. As exploration and drilling technology have improved, this goal has become more important in the industry for successful oil, gas, and geothermal well exploration and production. For example, to take advantage of the several advances in the design of various tools and techniques for oil and gas exploration, it would be beneficial to have real time data such as temperature, pressure, inclination, salinity, drill bit condition, formation evaluation, etc.

Real time data is essential for efficient and environmentally responsible well construction. Currently, the speed of data acquisition in well construction ranges from a few bits per second to gigabytes per second. All systems in use today suffer from limitations related to transmission media structure and composition. This disclosure presents improvements that will enhance data acquisition in well construction and operation.

SUMMARY OF THE INVENTION

Briefly stated, the invention is a system for transmitting data through a string of downhole components.

In accordance with an aspect of the invention, the system includes a plurality of downhole components, such as sections of pipe in a drill string. Each downhole component includes a tool joint comprising a pin end or a box end. The pin end of one downhole component is adapted to be connected to the box end of another downhole component.

The tool joints comprise loadable annular shoulders within their pin end and box end, each end having an annular groove therein. The loadable annular shoulders may be primary annular shoulders or secondary annular shoulders for purposes of drill string make up.

In some configurations, the loadable annular shoulders may comprise an adapter mounted on the pin end and in the box end drill pipe joints. The annular adapters may comprise an annular groove.

The annular groove in the loadable shoulders, whether in an adapter or a pipe end shoulder, may weaken the respective shoulders, risking damage to the shoulders when fully loaded. In some embodiments, the adapter may be hardened to improve the durability of the adapter acting as a grooved shoulder. Hardening the walls of the groove by about 0.05% to about 5% above the hardness of the surrounding shoulder, whether a hardened adapter or pipe end shoulder, as measured on the Rockwell C scale, may increase the durability of the grooved shoulders when fully loaded.

The walls of the annular groove may comprise a region extending into shoulder that is harder than the surrounding annular shoulder. The hardened annular groove may comprise deformed wall surfaces. The deformed wall surfaces of the hardened annular groove may comprise indentations produced by means of peening, shot peening, hammer peening, laser peening, ultra-sonic peening, grit peening, glass peening, or a combination thereof. The hardness region may extend from the deformed wall surfaces into the annular shoulder a distance of about between 0.001 mm to about 3 mm. The hardened region may not be uniform in depth on all sides of the annular groove.

An annular channel, or U-shaped trough, may be disposed within the annular groove, and a wire coil may be arranged within the annular channel. The annular channel, or U-shaped trough, may be comprised of a magnetically conductive electrically insulating (MCEI) soft magnetic material, such as Ferrite, suitable for reducing the signal loss across inductively coupled channels of adjacent connected drill pipes.

The MCEI material may be sintered from a powder comprising manganese and iron micron and sub-micron particles in sufficient quantities, such as an average of about 8:2 and 2:8 respectively, to achieve a reduction in signal loss across connected drill pipes. The powder composition comprising iron and manganese particles may have an average particle diameter of between 350 μm and 1250 μm, or in some cases the powder composition may have particles having an average particle diameter of between 600 nm and 900 nm. The powder composition may also comprise one or more of oxygen, magnesium, calcium, beryllium, and other transition metals on the Periodic Table or a combination thereof. Signal losses are inherent in inductively coupled systems. An inductively coupled system's utility and efficiency may be dependent on the reduction of signal losses along the drill string.

In transmitting signals along a drill string, signal losses may occur at each connected drill pipe joint. Since the losses may accumulate along the drill string, therefore, repeaters are required periodically to boost the signal. The use of Ferrites and other compositions and structures have been successful in reducing signal losses. Signal losses from inductively coupled drill pipes have been measured up to around 70% of the transmitted signal at each connection. The annular channel comprising the soft magnetic material of this disclosure combined with the closing of gaps in the wired annular channel may reduce the signal loss to below 50% of the transmitted signal and further to around 5% of the transmitted signal.

The annular channel may comprise a unitary structure or it may comprise a plurality of segments arranged annularly in close proximity. A unitary annular channel may be preferable for reducing signal losses. The unitary structure or at least one segment of the annular channel may comprise at least one or more enclosed orifices in the bottom wall portion of the annular channel. One end of the wire coil located in the annular channel may pass through one of the orifices to connect the wire coil to a cable running the length of the drill pipe. The other end of the coil may pass through another orifice to connect to an electrical ground, such as the adjacent shoulder. Enclosed orifices in the annular channel may reduce gaps that cause signal losses. A gasket may be installed in the orifice to seal the opening around the wire coil.

An annular-channel insert may be positioned between the annular channel and the walls of the annular shoulder groove. The insert may comprise a material hardness on the Rockwell C scale greater than the walls of the shoulder groove. The insert may serve to house the annular channel and as the electrical ground for the wire coil. The orifices in the annular channel may align with an orifice in the annular channel insert to connect the wire coil to ground or to a cable leading to the opposite end of the drill pipe and to a wire coil within a similarly configured annular channel within a hardened annular groove in a loadable shoulder at the opposite end of the drill pipe. At least one enclosed orifice may provide a means for locating and securing the annular channel within the hardened groove.

Each pin end includes external threads and an internal pin face distal to the external threads. The internal pin face is generally transverse to the longitudinal axis of the downhole component.

Each box end includes an internal shoulder face with internal threads distal to the internal shoulder face. The internal shoulder face is generally transverse to the longitudinal axis of the downhole component. The internal pin face and the internal shoulder face are aligned with and proximate each other when the pin end of the one component is threaded into a box end of the other component.

The system also includes a first communication element or annular channel located within a first recess or annular groove formed in each internal pin face and a second communication element or annular channel located within a second recess or annular groove formed in each internal shoulder face. Preferably, the first and second communication elements are inductive coils. Most preferably, the inductive coils each lie within a magnetically conductive, electrically insulating element, which take the form of a U-shaped trough or annular channel.

The system also includes a conductor in communication with and running between each first and second communication element in each component.

In accordance with another aspect of the invention, the downhole components include a first and a second magnetically conductive, electrically insulating element (MCEI element) located proximate the first and second end of each downhole component. The MCEI elements include a U-shaped trough, or annular channel, with a bottom, first and second sides and an opening between the two sides. The magnetically conductive material may be formed in segments with each segment interspersed with magnetically nonconductive material.

The first and second troughs are configured so that the respective first and second sides and openings of the first and second troughs of connected components are substantially proximate to and substantially aligned with each other.

An electrically conducting coil may be located in each trough with an electrical conductor in electrical communication with and running between the two coils in each component.

In operation, a varying current applied to a first coil in one component generates a varying magnetic field in the first magnetically conductive, electrically insulating element, which varying magnetic field is conducted to and thereby produces a varying magnetic field in the second magnetically conductive, electrically insulating element of a connected component, which magnetic field thereby generates a varying electrical current in the second coil in the connected component, to thereby transmit a data signal.

In accordance with another aspect of the invention, the system includes a plurality of downhole components, each with a first end and a second end, the first end of one downhole component being adapted to be connected to the second end of another downhole component. A first electrically conducting coil having no more than five turns, and preferably no more than two, most preferably no more than one, is placed at each first end, while a second electrically conducting coil having no more than five turns, and preferably no more than two, most preferably no more than one, is placed at each second end. The first and second coils of connected components are configured so as to be substantially proximate to and substantially aligned with each other. An electrical conductor is provided which is in electrical communication with and runs between each first and second coil in each component. In operation, a varying current applied to a first coil in one component generates a varying magnetic field, which magnetic field induces a varying electrical current in the second coil in the connected component, to thereby transmit a data signal.

In accordance with another aspect, the invention is a downhole tool adapted to transmit data over the systems described above.

The aspect of the invention using inductive coils is communication elements provides the advantage that, as the data transmission line uses alternating conductive and inductive elements, the inductive elements at the end of each segment enable the transmission line to be lengthened or shortened during drilling operations without need for an electrically conductive path across the joint. Indeed, the only closed electrical path is within each individual element, which constitutes a single closed path for electrical current.

It should be noted that, as used herein, the term "downhole" is intended to have a relatively broad meaning, including such environments as drilling in oil and gas, gas and geothermal exploration, the systems of casings and other equipment used in oil, gas and geothermal production.

It should also be noted that the term "transmission" as used in connection with the phrase data transmission or the like, is intended to have a relatively broad meaning, referring to the passage of signals in at least one direction from one point to another.

It should further be noted that the term "magnetically conductive" refers to a material having a magnetic permeability greater than that of air.

It should further be noted that the term "electrically insulating" means having a high electrical resistivity, preferably greater than that of steel.

The present invention, together with attendant objects and advantages, will be best understood with reference to the detailed description below in connection with the attached drawings.

BRIEF DESCRIPTION OF THE DRAWINGS

(Prior Art) FIG. 5 is a perspective view of a section of drill pipe including the data transmission system.

(Prior Art) FIG. 6 is a perspective view of the pin end of the section of drill pipe of (Prior Art) FIG. 5.

(Prior Art) FIG. 7 is a cross-sectional view along line 3-3 of (Prior Art) FIG. 6.

(Prior Art) FIG. 8 is an enlarged perspective view of the box end of the section of drill pipe of (Prior Art) FIG. 5.

(Prior Art) FIG. 9 is a cross-sectional view along line 5-5 of (Prior Art) FIG. 8.

(Prior Art) FIG. 9A is an enlarged partial view taken from (Prior Art) FIG. 9.

(Prior Art) FIG. 10 is a cross-sectional view showing the pin end of (Prior Art) FIGS. 6 and 10 connected to box end of (Prior Art) FIGS. 8 and 9.

(Prior Art) FIG. 11 is a cross-sectional view showing the connection of an alternate design of a pin end and a box end.

(Prior Art) FIG. 12 is a cross-sectional view similar to (Prior Art) FIG. 10 showing an alternative placement of the recess and MCEI elements.

(Prior Art) FIG. 12A is an enlarged partial view taken from (Prior Art) FIG. 12.

(Prior Art) FIG. 13 is an enlarged cross-sectional view from (Prior Art) FIG. 7 showing the placement of the magnetically conductive, electrically insulating (MCEI) element in the recess in the pin end of (Prior Art) FIG. 6.

(Prior Art) FIG. 14 is an exploded perspective view of a MCEI element and a coil.

(Prior Art) FIG. 15 is a perspective view showing the coil placed in the MCEI element of (Prior Art) FIG. 14.

(Prior Art) FIG. 16 is a cross-sectional view along line 12-12 of (Prior Art) FIG. 15.

(Prior Art) FIG. 17 is a perspective view of an embodiment of the MCEI element.

(Prior Art) FIG. 17A is an enlarged view of a portion of the MCEI element of (Prior Art) FIG. 17.

(Prior Art) FIG. 18 is a cross-sectional view along line 14-14 of (Prior Art) FIG. 18.

(Prior Art) FIG. 19 is a cross-sectional view along line 15-15 of (Prior Art) FIG. 5.

(Prior Art) FIG. 20 is a schematic diagram of the electrical and magnetic components of the data transmission system.

(Prior Art) FIG. 21 is an enlarged cross-section of a connection between MCEI elements of a connected pin and box end.

(Prior Art) FIG. 22 is a cross-sectional view showing a drill bit and a sub containing a sensor module.

(Prior Art) FIG. 22A is an enlarged cross-sectional view from (Prior Art) FIG. 22.

(Prior Art) FIG. 23 is a circuit diagram of the of the sensor module shown in (Prior Art) FIG. 22.

(Prior Art) FIGS. 24 and (Prior Art) 24A are cross-sectional views of an alternative embodiment that does not use MCEI elements.

(Prior Art) FIG. 25 is a schematic representation of the downhole transmission system in use on a drilling rig.

Figure 3:
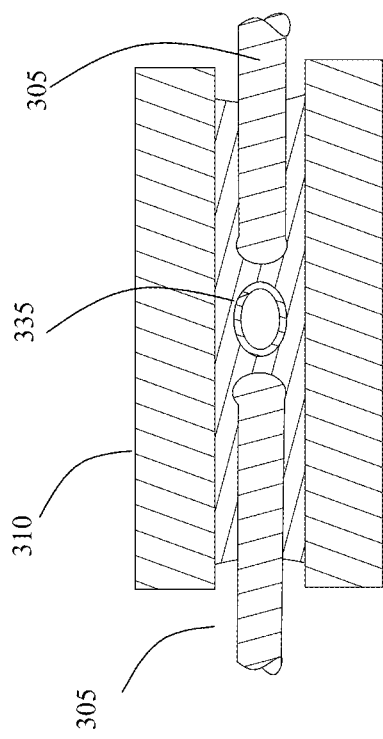
FIG. 3 is a top view of a portion of a wired channel, or of a wired channel segment.

(Prior Art) FIG. 3, U.S. Pat. No. 10,612,318, is a perspective top diagram of a wired channel comprising channel segments and an unshielded gap proximate the respective ends of the wire coil within the channel.

(Prior Art) FIG. 5, U.S. Pat. No. 10,767,422, is a section diagram of a drill pipe pin end comprising a hardened adapter mounted on the drill pipe.

DETAILED DESCRIPTION OF THE PREFERRED EMBODIMENTS

The drill pipe ends comprise loadable annular shoulders within their pin end and box end tool joints, each having an annular groove, or U-shaped trough therein. See Prior Art FIGS. 6, 7, 13, on sheet 5/17 and Prior Art FIGS. 8, 9, and 9A on sheet 6/17, herein. The loadable annular shoulders may be primary annular shoulders or secondary annular shoulders for purposes of drill string make up.

In some configurations, the loadable annular shoulders may comprise an adapter mounted on the pin end and in the box end drill pipe joints. The annular adapters may comprise an annular groove. See Prior Art FIG. 5 of U.S. Pat. No. 10,767,422 on sheet 17/17, herein.

Unless otherwise indicated the following detailed description refers to FIGS. 1-4, the annular groove 330 in the loadable shoulders 320, whether in an adapter (Sheet 17/17) or a pipe end shoulder (Sheets 5/17 and 6/17) 320, may weaken the respective shoulders 320, risking damage to the shoulders 320 when fully loaded. In some embodiments, the adapter may be hardened to improve the durability of the adapter acting as a grooved shoulder 320. Hardening the walls of the groove 330 by about 0.05% to about 5% above the hardness of the surrounding shoulder 320, whether a hardened adapter or pipe end shoulder, as measured on the Rockwell C scale, may increase the durability of the grooved shoulders 320 when fully loaded.

The walls of the annular groove 330 may comprise a region 315 extending into shoulder that is harder than the surrounding annular shoulder 320. The hardened annular groove 315 may comprise deformed wall surfaces. The deformed wall surfaces of the hardened annular groove 315 may comprise indentations (not shown) produced by means of peening, shot peening, hammer peening, laser peening, ultra-sonic peening, grit peening, glass peening, or a combination thereof. The hardness region 315 may extend from the deformed wall surfaces into the annular shoulder 320 a distance of about between 0.001 mm to about 3 mm. The hardened region 315 may not be uniform in depth on all sides of the annular groove 330.

An annular channel, or U-shaped trough, 310 may be disposed within the annular groove 330, and a wire coil 305 may be arranged within the annular channel 310. The annular channel, or U-shaped trough, 310 may be comprised of a magnetically conductive electrically insulating (MCEI) soft magnetic material, such as Ferrite, suitable for reducing the signal loss across inductively coupled channels of adjacent connected drill pipes. See Prior Art FIGS. 10 and 21, Sheet 7/17, herein.

The annular channel's 310 MCEI material may be sintered from a powder comprising manganese and iron micron and sub-micron particles in sufficient quantities, such as an average of about 8:2 and 2:8 respectively, to achieve a reduction in signal loss across connected drill pipes. The powder composition comprising iron and manganese particles may have an average particle diameter of between 350 μm and 1250 μm, or in some cases the powder composition may have particles having an average particle diameter of between 600 nm and 900 nm. (See for example Col. 66, lines 35-61, U.S. patent Ser. No. 11/033,958, herein) The powder composition may also comprise one or more of oxygen, magnesium, calcium, beryllium, and other transition metals on the Periodic Table or a combination thereof. Signal losses are inherent in inductively coupled systems. An inductively coupled system's utility and efficiency may be dependent on the reduction of signal losses along the drill string.

In transmitting signals along a drill string, signal losses may occur at each connected drill pipe joint. Since the losses may accumulate along the drill string, repeaters are required periodically to boost the signal. The use of Ferrites and other compositions and structures have been partially successful in reducing signal losses. However, signal losses from inductively coupled drill pipes may be up to around 70% of the transmitted signal at each connection. Gaps in the U-shaped trough of prior art inductive couplers like those shown on sheet 10/17, FIGS. 14, 15, and 17, herein, may be significant contributors of signal losses because the magnetic field may be exposed to the conductive steel of the drill pipe shoulders. Prior Art FIG. 3, U.S. Pat. No. 10,612,318, at about ref. 113, depicts a typical gap in the U-shaped trough where the electrical coil wire of the coil is exposed to the steel of the respective drill pipe shoulders. By closing the gap as disclosed herein, such losses may be substantially reduced. The annular channel comprising the soft magnetic material of this disclosure combined with the closing of gaps using a unitary annular channel, or by using annular channel segments, having enclosed orifices may reduce the signal loss to below 50% of the transmitted signal and further up to around 5% of the transmitted signal. The annular channel may comprise a unitary structure or it may comprise a plurality of segments arranged annularly in close proximity. A unitary annular channel may be preferable for reducing signal losses. The unitary structure or at least one segment of the annular channel may comprise at least one or more enclosed orifices 335 in the bottom wall portion of the annular channel. One end of the wire coil 340 located in the annular channel may pass through one of the orifices 335 to connect the wire coil 340 to a cable running the length of the drill pipe. The other end of the coil 345 may pass through another orifice to connect to an electrical ground, such as the adjacent shoulder 320. Enclosed orifices 335 in the annular channel may reduce gaps that cause signal losses. A gasket, not shown, may be installed in the orifice 335 to seal the opening around the wire coil 305.

An annular-channel insert 325 may be positioned between the annular channel 310 and the walls of the annular shoulder groove 330. The insert 325 may comprise a material hardness on the Rockwell C scale greater than the walls of the shoulder groove 330. The insert 325 may serve to house the annular channel 310 and as the electrical ground for the wire coil 345. The orifices 335 in the annular channel may align with an orifice in the annular channel insert to connect the wire coil 345 to ground or the wire coil 340 to a cable leading to the opposite end of the drill pipe and to a wire coil within a similarly configured annular channel within a hardened annular groove in a loadable shoulder at the opposite end of the drill pipe. At least one enclosed orifice 335 may provide a means for locating and securing the annular channel 310 within the hardened groove 330.

Referring to the drawings, (Prior Art) FIG. 5 is a perspective view of a section of drill pipe 11 including the data transmission system of the present invention. The most preferred application of the data transmission system is in sections of drill pipe, which make up a drill string used in oil and gas or geothermal exploration. Alternatively, other downhole components within which the data transmission system can be incorporated include such downhole tools such as drill bits, data sensors, crossover subs, and motors.

(Prior Art) FIG. 25 schematically illustrates a drilling operation making use of downhole components having the data transmission system of the present invention. The operation includes a rig 211. A data transceiver 217 is fitted on top of the kelly 219, which is, in turn, connected to a string of drill pipe 215. Also within the drill string are tools such as jars and stabilizers. Drill collars and heavyweight drill pipe 211 are located near the bottom of the drill string. A sensor module 223 is included just above the bit 213. As will be discussed in more detail below, each of these components forms part of the drilling network.

The data transmission system of the present invention may also be used with the casings, sensors, valves, and other tools used in oil and gas, or geothermal production.

The depicted section 11 includes a pin end 13, having external tapered threads 15 (see (Prior Art) FIG. 6), and a box end 17, having internal tapered threads 18 (See (Prior Art) FIG. 8). Between the pin end 13 and box end 17 is the body 19 of the section. A typical length of the body 19 is 30 and 90 feet. Drill strings in oil and gas production can extend as long as 20,000 feet, which means that as many as 700 sections of drill pipe and downhole tools can be used in the drill string.

Figure 1:
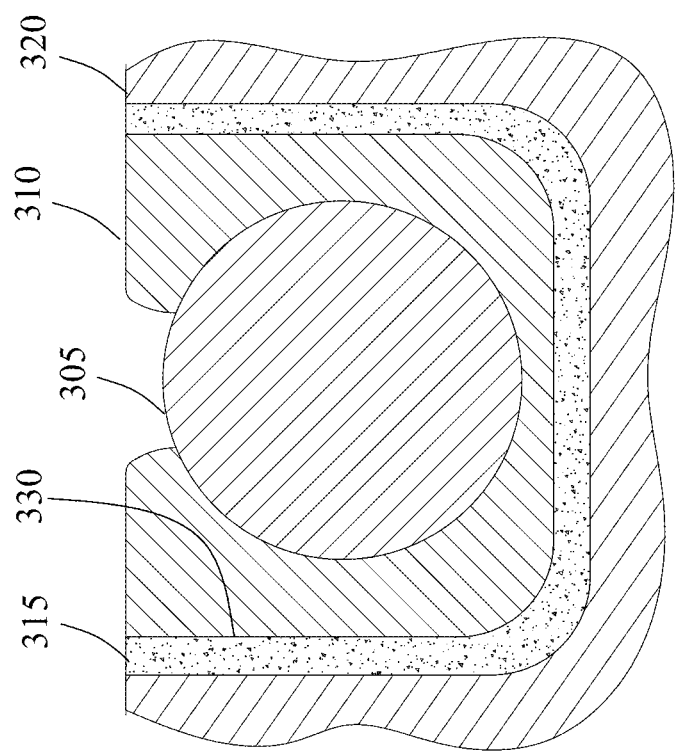
FIG. 1 is a sectioned view of a wired channel of the present invention located in a hardened grove of a drill pipe shoulder.
Figure 2:
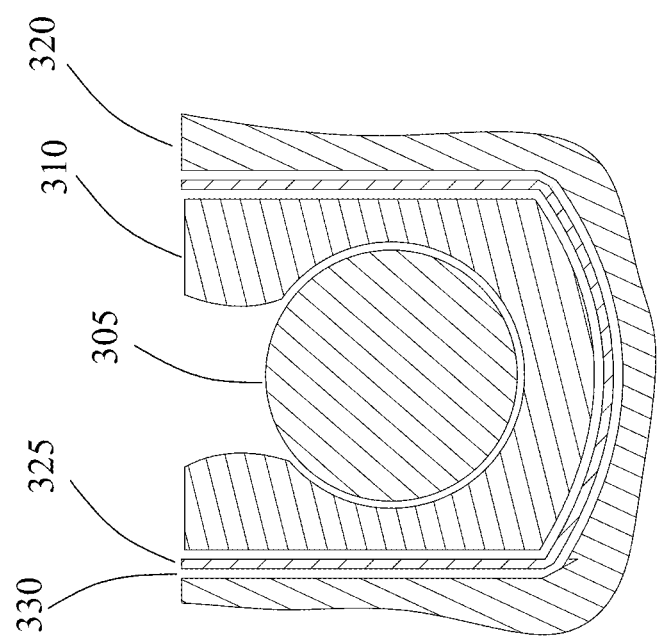
FIG. 2 is a sectioned view of a wired channel disposed within a hardened insert disposed inside a groove of a drill pipe shoulder.
Figure 4:
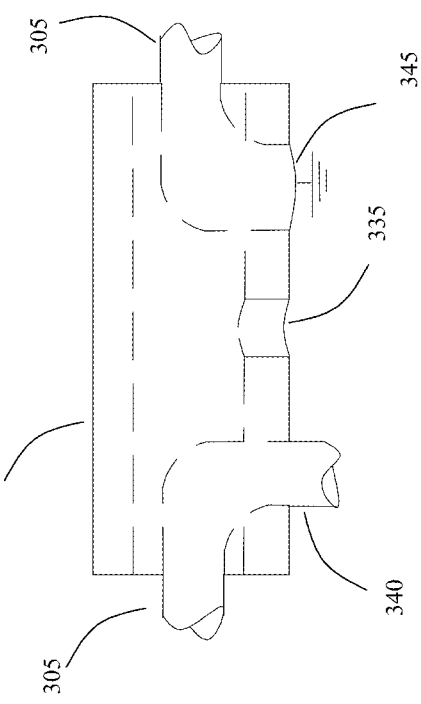
FIG. 4 is a side view of the wired channel shown in FIG. 3.

There are several designs for the pin and box end of drill pipe. At present, the most preferred design to use with the present invention is that which is described in U.S. Pat. No. 5,908,212 to Grant Prideco, Inc. of Woodlands, Tex., the entire disclosure of which is incorporated herein by reference. As shown in FIGS. 2 and 3, the pin end 13 includes an external, primary shoulder 21, and an internal, secondary shoulder or face 23. As shown in FIGS. 4 and 5, the box end 15 includes an external, primary shoulder 31 and an internal, secondary shoulder or face 33. As shown in FIG. 6, when two sections of drill pipe are connected, the pin end 13 is threaded into the box end 15 with sufficient force so that the primary external shoulder 21 on the pin end engages the primary shoulder face 31 on the box end. As a result of this connection being indexed by the secondary shoulder 21 and the secondary shoulder face 31, the face 23 on the pin end is reliably brought into close proximity or contact with the shoulder 33 on the box end. The advantages this provides to the present invention will be discussed below.

An alternate design for the pin and box end is disclosed in U.S. Pat. No. 5,454,605, assigned to Hydrill Company, Houston, Tex. As seen in (Prior Art) FIG. 11, the pin end 201 is cooperatively engaged with the box end 203 forming a junction of the pipe ends. Thread form 205 is unique in that it is wedged shaped and totally engaged in order to distribute all the bearing stresses resisting torsional makeup. When the joint is fully engaged, a gap 207 occurs between the primary shoulders. No sealing or load bearing is provided by the shoulders adjacent the threads of the pin and box ends. An insert 209 is provided in the box end to house the MCEI elements 215 of the present invention. Mating elements 213 are provided in recesses in the pin end. An electrical conductor 211 is provided for transmitting the carrier signal along the length of the drill pipe to the opposite end not shown. An insert, not shown, also may be provided in the pin end in order to accommodate further modification is design.

As shown in (Prior Art) FIGS. 6, 7, and 13, the pin end 13 preferably includes a recess 25 in the secondary or internal shoulder or face 23. Preferably, the recess is located so as to lie equidistant between the inner and outer diameter of the secondary shoulder or face 23. Alternatively, the recess is formed at either the inner or the outer diameter of the face, thereby creating a recess that is open on two sides.

Preferably, the recess is machined into the face by conventional tools either before or after the tool joint is attached to the pipe. The dimensions of the recess can be varied depending on various factors. For one thing, it is desirable to form the recess in a location and with a size that will not interfere with the mechanical strength of the pin end. Further, in this orientation, the recesses are located so as to be substantially aligned as the joint is made up. Other factors will be discussed below.

As can be seen in these figures, the recess is preferably configured so as to open axially, that is, in a direction parallel to the length of the drill string. In an alternative embodiment shown in (Prior Art) FIGS. 12 and 12A, the recesses 85 and 87 are located on the outside diameter of the pin end 81 and on the inside diameter of the box end 83. In this way, the recesses are configured so as to open radially, that is, in a direction perpendicular to the length of the drill string. As depicted in (Prior Art) FIG. 12A, the MCEI elements 89 and 91 may be slightly offset in order to accommodate manufacturing tolerances. This offset configuration does not materially affect the performance of the inductive elements of the present invention whether in an axial or radial configuration.

Referring to (Prior Art) FIGS. 7, 7A, 9 and 9A, lying within the recesses 25 and 45 formed in the internal pin face and internal shoulder face 45 respectively is a communication element. As will be discussed below, the preferred communication element is an inductive coil. However, other communication elements, such as acoustic transceivers, optic fiber couplers and electrical contacts are also benefited by being placed in a recess formed in the internal pin face and internal shoulder face. In particular, placing the communication elements in recesses within internal faces provides for better protection from the harsh drilling environment. Also, when using a pipe joint such as that shown in (Prior Art) FIG. 10 that also includes external abutting faces 21 and 31, the internal faces 23 and 33 are brought together in a more reliable manner. That is, with the primary load taken by the external faces 21 and 31, the internal faces 23 and 33 are brought together with a more consistent force. Preferably, the internal faces are less than about 0.03" apart when the adjacent components are fully threaded together. More preferably, the internal faces are touching. Most preferably, the internal faces are in a state of compression.

Returning to a discussion of the preferred embodiment with inductive coils as the communication elements, it is noted that a typical drill pipe alloy, 4140 alloy steel, having a Rockwell C hardness of 30 to 35, has a magnetic permeability of about 42. The magnetic permeability of a material is defined as the ratio of the magnetic flux density B established within a material divided by the magnetic field strength H of the magnetizing field. It is usually expressed as a dimensionless quantity relative to that of air (or a vacuum). It is preferable to close the magnetic path that couples the adjacent coils with a material having a magnetic permeability higher than the steel. However, if the magnetic material is itself electrically conducting, then they provide an alternate electrical path to that offered by the adjacent loops. The currents thus generated are referred to as eddy currents; these are believed to be the primary source of the losses experienced in prior-art transformer schemes. Since the magnetic field is in a direction curling around the conductors, there is no need for magnetic continuity in the direction of the loop.

In the preferred embodiment illustrated in (Prior Art) FIGS. 7 and 13, there is located within the recess 25 a magnetically conducting, electrically insulating (MCEI) element 27. As can best be seen in the cross section in (Prior Art) FIG. 13, the MCEI element 27 includes a U-shaped trough 29 with a bottom 55, a first side 57 and a second side 59, thus forming an opening between the two sides. The dimensions of the MCEI element 27 through 29 can be varied based on the following factors. First, the MCEI element must be sized to fit within the recess 25. In addition, as will be discussed in detail below, the height and width of the trough should be selected to optimize the magnetically conducting properties of the MCEI element.

One property of the MCEI element is that it is magnetically conducting. One measure of this property is referred to as the magnetic permeability discussed above. In general, the magnetically conducting component should have a magnetic permeability greater than air. Materials having too high of a magnetic permeability tend to have hysteresis losses associated with reversal of the magnetic domains themselves. Accordingly, a material is desired having a permeability sufficiently high to keep the field out of the steel and yet sufficiently low to minimize losses due to magnetic hysteresis. Preferably, the magnetic permeability of the MCEI element should be greater than that of steel, which is typically about 40 times that of air, more preferably greater than about 100 times that of air. Preferably, the magnetic permeability is less than about 2,000. More preferably, the MCEI element has a magnetic permeability less than about 800. Most preferably, the MCEI element has a magnetic permeability of about 125.

In order to avoid or reduce the eddy currents discussed above, the MCEI element is preferably electrically insulating as well as magnetically conductive. Preferably, the MCEI element has an electrical resistivity greater than that of steel, which is typically about 12 micro-ohm cm. Most preferably, the MCEI element has an electrical resistivity greater than about one million ohm-cm.

The MCEI element 27 is preferably made from a single material, which in and of itself has the properties of being magnetically conductive and electrically insulating. A particularly preferred material is ferrite. Ferrite is described in the on-line edition of the Encyclopedia Britannica as "a ceramic-like material with magnetic properties that are useful in many types of electronic devices. Ferrites are hard, brittle, iron-containing, and generally gray or black and are polycrystalline—i.e., made up of a large number of small crystals. They are composed of iron oxide and one or more other metals in chemical combination." The article on ferrite goes on to say that a "ferrite is formed by the reaction of ferric oxide (iron oxide or rust) with any of a number of other metals, including magnesium, aluminum, barium, manganese, copper, nickel, cobalt, or even iron itself." Finally, the article states that the "most important properties of ferrites include high magnetic permeability and high electrical resistance." Consequently, some form of ferrite is ideal for the MCEI element in the present invention. Most preferably, the ferrite is one commercially available from Fair-Rite Products Corp., Wallkill, N.Y., grade 61, having a magnetic permeability of about 125. There are a number of other manufacturers that provide commercial products having a corresponding grade and permeability albeit under different designations.

As an alternative to using a single material that is; both magnetically conductive and electrically insulating, the MCEI element can be made from a combination of materials selected and configured to give these properties to the element as a whole. For example, the element can be made from a matrix of particles of one material that is magnetically conductive and particles of another material that is electrically insulating, wherein the matrix is designed so as to prevent the conduction of electrical currents, while promoting the conduction of a magnetic current. One such material, composed of ferromagnetic metal particles molded in a polymer matrix, is known in the art as "powdered iron." Also, instead of a matrix, the MCEI element may be formed from laminations of a materials such as a silicon transformer steel separated by an electrically insulating material, such as a ceramic, mineral (mica), or a polymer. Because the induced electric field is always perpendicular to the magnetic field, the chief requirement for the MCEI element is that the magnetic field be accommodated in a direction that wraps around the coil, whereas electrical conduction should be blocked in the circumferential direction, perpendicular to the magnetic field and parallel to the coil.

In accordance with one embodiment of the present invention, the MCEI is formed from a single piece of ferrite of other piece of MCEI material. This can be accomplished by molding, sintering, or machining the ferrite to the desired shape and size. (Prior Art) FIGS. 14 and 15 show such an embodiment. As can be seen, it is preferable to leave a small gap 101 in the MCEI element 27 to accommodate insertion of the input leads to the coil 63.

In a more preferred embodiment shown in (Prior Art) FIG. 17, the MCEI element 131 is formed from several segments of ferrite 133 which are held together in the appropriate configuration by means of a resilient material, such as an epoxy, a natural rubber, a fiberglass or carbon fiber composite, or a polyurethane. Preferably, the resilient material both forms a base 135 for the element and also fills the gaps 137 between the segments of MCEI material. In this way, the overall strength and toughness of the MCEI element 131 is improved. A preferred method of forming a segmented MCEI element 131 begins with providing a mold having a generally u-shaped trough conforming to the final dimensions of the MCEI element. A two-part, heat-curable epoxy formulation is mixed in a centrifuge cup, to which the individual ferrite segments and a length of fiberglass rope are added. The parts are centrifuged for up to 30 minutes to cause all bubbles induced by mixing to rise out of the viscous liquid, and to cause the liquid to penetrate and seal any porosity in the ferrite. The fiberglass rope is then laid in the bottom of the mold, which is either made from a material which does not bond to epoxy, such as polymerized tetrafluroethane or which is coated with a mold release agent. The individual u-shaped ferrite segments are then placed on top of the fiberglass rope, to fill the circle, except for the gap or hole 101 of (Prior Art) FIGS. 14 and 17. Any excess epoxy is wiped out of the u-shaped groove. The upper surfaces of the parts can be precisely aligned with each other by holding them in position with magnets placed around the u-shaped trough in the mold. After the epoxy is cured, either at room temperature or in an oven, the tough flexible ferrite assembly is removed from the mold.

As seen in (Prior Art) FIGS. 7 and 13, the MCEI element is preferably fit within the recess 25. Most preferably, a resilient material 61, such as a polyurethane, is disposed between the MCEI element 27 and the steel surface of the recess 25. This resilient material 61 is used to hold the MCEI element 27 in place. In addition, the resilient material 61 forms a transition layer between the MCEI element and the steel which protects the element from some of the forces seen by the steel during joint makeup and drilling. Preferably, the resilient material is a flexible polymer, most preferably a two-part, heat-curable, aircraft grade urethane, such as grade 1547, manufactured by PRC Desoto International, Glendale, Calif. It is important that the resilient material 61 will withstand the elevated pressures and temperatures in downhole conditions. Consequently, it is preferred to treat the material to make sure that it does not contain any voids or air pockets. Preferably the resilient material is centrifuged to remove all bubbles that might be introduced during mixing. One such treatment method involves subjecting the material in a centrifuge. A most preferred form of this method subjects the material to a centrifuge at between 2500 to 5000 rpm for about 0.5 to 3 minutes.

Lying within the trough of the MCEI element 27 is an electrically conductive coil 63. This coil is preferably made from at least one loop of an insulated wire, most preferably only a single loop. The wire is preferably made of copper and insulated with varnish, enamel, or a polymer. Most preferably, the wire is insulated with a tough, flexible polymer such as high density polyethylene or polymerized tetrafluoroethane (PTFE). The diameter of the wire, with insulation, is preferably selected so as to be slightly less than the width of the U-shaped trough in the MCEI element. As will be discussed below, the specific properties of the wire and the number of loops is important in providing a proper impedance for the coil 63.

For a given application, the transformer diameter is fixed by the diameter of the pipe. The impedance of the transformer, and its desired operating frequency, can be adjusted by two factors: the number of turns in the conductor and the ratio of length to area of the magnetic path, which curls around the conductors. Increasing the number of turns decreases the operating frequency and increases the impedance. Lengthening the magnetic path, or making it narrower, also decreases the operating frequency and increases the impedance. This is accomplished by increasing the depth of the U-shaped trough or by decreasing the thickness of the side-walls. Adjusting the number of turns gives a large increment, while adjusting the dimensions of the trough enables small increments. Accordingly, the invention allows the impedance of the transformer portion of the transmission line to be precisely matched to that of the conductor portion, which is typically in the range of 30 to 120 ohms. Although an insulated copper wire is preferred, other electrically conductive materials, such as silver or coppercoated steel, can be used to form the coil 63.

As can be seen in (Prior Art) FIG. 16, the coil 63 is preferably embedded within a material 65, which material fills the space within the trough of the MCEI element 27. Naturally, this material 65 should be electrically insulating. It is also preferable that this material 65 is resilient so as to add further, toughness to the MCEI element. The preferred material to use for this purpose is a two-part epoxy formulation, preferably one filled with a powdered material such as fumed silica or fine aluminum oxide to provide abrasion resistance. The applicants have used standard commercial grade epoxy combined with a ceramic filler material, such as aluminum oxide, in proportions of about 50/50 percent. Other proportions may be desirable, but the filler material should not be less than 3 percent nor greater than 90 percent in order to achieve suitable abrasion resistance as well as adequate adhesiveness. Alternatively, other materials, such as room-temperature curable urethanes, are used. As with the resilient material 63, it is important that the material 65 be able to withstand the extreme conditions found downhole. Consequently, it is important to treat the material in such a way as to ensure the absence of voids or air pockets. The centrifugal treatment for material 63 can be used for material 65 as well.

As can be seen in (Prior Art) FIGS. 8, 9 and 10, the box end 15 also includes a recess 45 similar to the recess 25 in the pin end, except that the recess 45 is formed in the internal, secondary shoulder 33 of the box end. A MCEI element 47, similar in all respects to the MCEI element 27, is located within the recess 45. A coil 49, similar in all respects to the coil 63, is located within the trough of the MCEI element 47 and embedded within material 48.

As can be seen in (Prior Art) FIG. 10, when the pin and box end are joined, the MCEI element 27 of the pin end and the MCEI element 47 of the box end are brought to at least close proximity. Preferably, the elements 27 and 47 are within about 0.5 mm of each other, more preferably within about 0.25 mm of each other. Most preferably, the elements 27 and 47 are in contact with each other.

Because the faces 23 and 33 of the pin and box end may need to be machined in the field after extended use, it may preferred to design the troughs in the pin and box end with a shape and size so as to allow the first and second conductive coils to lie in the bottom of the respective troughs and still be separated a distance from the top of the respective first and second sides. As a result, the faces 23 and 33 can be machined without damaging the coils lying at the bottom of the troughs. In this embodiment, this distance is preferably at least about 0.01 inches, more preferably, this distance is at least about 0.06 inches.

An electrical conductor 67 is attached to the coil 63, in (Prior Art) FIGS. 7, 13, 9, 9A, 10, 11, and 12. At present, the preferred electrical conductor is a coaxial cable, preferably with a characteristic impedance in the range of about 30 to about 120 ohms, most preferably with a characteristic impedance in the range of 50 to 75 ohms Because the attenuation of coaxial cable decreases with increasing diameter, the largest diameter compatible with installation in pipe chosen for a particular application should be used. Most preferably the cable has a diameter of about 0.25" or larger. Preferably the shield should provide close to 100% coverage, and the core insulation should be made of a fully-dense polymer having low dielectric loss, most preferably from the family of polytetrafluoroethylene (PTFE) resins, Dupont's Teflon® being one example. The insulating material surrounding the shield should have high temperature resistance, high resistance to brine and chemicals used in drilling muds. PTFE is preferred, or most preferably a linear aromatic, semi-crystalline, polyetheretherketone thermoplastic polymer manufactured by Victrex PLC under the trademark PEEK®. A typical supplier for such material is Zeus Products, Orangeburg, S.C.

Alternatively, the conductor can be a twisted pair of wires, although twisted pair generally suffers from higher attenuation than coaxial cable. Twisted pair generally has a characteristic impedance of about 120 ohms, which would provide a desired matching impedance to certain coil configurations. In addition, for certain configurations of drill pipe, there may be limited room at either end of the pipe for a large-diameter coaxial cable. In this case, a short length of twisted pair might provide a small-diameter transition between the coils at the ends of the pipe and a larger-diameter coaxial cable that runs most of the length of the pipe. For lengths of a few feet, the higher attenuation of twisted pair, and its mismatch of impedance to the coaxial cable are of little consequence. However, if desired, the impedance of the twisted pair can be matched to that of the coaxial cable with a small transmission line transformer (balun).

Although the pipe itself could be used as one leg of the current loop, coaxial cable is preferred, and most preferably the conductor loop is completely sealed and insulated from the pipe.

It is preferable to select the electrical properties of the conductor so as to match the impedance of the coils to which it is attached. Preferably, the ratio of the impedance of the electrical conductor to the impedance of the first and second electrically conductive coils is between about 1:2 and 2:1. Most preferably, it is close to 1:1.

The preferred data transmission system provides; a relatively broad bandwidth. While not wishing to be bound by any particular theory, it is currently believed that this is accomplished by the low number of turns of the conductor and the low reluctance of the magnetic path, thus producing a surprisingly low mutual inductance for such a large diameter coil. For a two-turn coil with a 4.75-inch diameter, the mutual inductance of the assembled toroid is about 1 micro Henry. With a 50 ohm resistive load, peak signal transmission is at about 4 MHz, and at power transmission extends from about 1 MHz to about 12 MHz. The inductive reactance is about 65 ohms, and the attenuation is only about 0.35 dB per joint, equivalent to power transmission of about 92 percent. As adjacent segments are assembled, a serial filter is created, which has the effect of reducing the bandwidth. If each individual transformer had a narrow bandwidth, the band-pass of the filter would change as additional segments are added, which would require that each individual element be separately tuned according to its position in the system. Nevertheless, a surprising feature of the invention is that identical segments can be assembled in any arbitrary number of joints while still enabling efficient signal coupling. The 30-joint test described below gave a total attenuation of 37.5 dB (0.018% power transmission), of which 70% was in the coaxial cable itself, which was chosen to have a shield diameter of 0.047 inches. Maximum power transmission was at 4.2 MHz and the bandwidth, at half power, of 2 MHz. Thus a six volt, 90 milliwatt signal resulted in a detected signal, after 30 joints, of 80 mV.

Although possible problems relating to attenuation make it is preferable to use an MCEI element in the system of the present invention, the inventors have found that using a coil having five turns or less can still produce a system with sufficient bandwidth to be useful. More preferably, such a system has 2 turns, and most preferably only a single turn 231. This alternative embodiment is shown in (Prior Art) FIGS. 24 and 24A. As can be seen, a single turn of a conductor 231 is placed within a recess 237 in the internal face 235 of the pin end. The coil 231 is connected to a conductor 233, which is in turn connected to a coil (not shown) in the box end of the downhole component.

It is preferred in the alternative embodiment in (Prior Art) FIGS. 24 and 24A, to insure that the frequency is sufficiently high, i.e. above about 5 MHz and sufficiently wide bandwidth (about 2 MHz). This system is useable with about 10 downhole components in series.

Turning again to the preferred embodiment, and as shown in (Prior Art) FIGS. 7, 9, 9A, 10, 11, and 13, it is preferred that the wire of the coil 63 extends through the MCEI element 27 to meet the electrical conductor 67 at a point behind the MCEI element. Also, referring to FIG. 9, the electrical conductor 67 and the wire of the coil 63 preferably meet in a passage 69 formed in the pin end. Likewise, referring to (Prior Art) FIG. 9A, the electrical conductor 67 and the wire of the coil 49 meet in a passage 70 formed in the box end. The passages 69 and 70 are holes, preferably drilled from one point in the bottom of the recess 25 and 45, respectively, through the enlarged wall of the pin end and box end, respectively, so that the holes open into the central bore of the pipe section 111. The diameter of the hole will be determined by the thickness available in the particular joint. For reasons of structural integrity it is preferably less than about one half of the wall thickness. Preferably, these holes have a diameter of about between 3 and 7 mm.

These two holes can be drilled by conventional means. Preferably, they are drilled by a technique known as gun drilling. Preferably, the recesses can be machined and the holes can be drilled in the field, so as to allow for retrofitting of existing drill pipe sections with the data transmission system of the present invention in the field.

As can be seen in (Prior Art) FIGS. 7 and 9, the electrical conductor 67 is protected within the holes 69 and 70 respectively. Nevertheless, after the conductor 67 is placed within these holes, it is preferable to add a sealing material such as urethane. As with all other materials used in the system of the present invention, it is important to select materials and prepare them so as to be able to withstand the extreme conditions of the downhole environment.

After exiting the holes 69 and 70, the electrical conductor passes through the interior of the body of the pipe section. Accordingly, it is important to provide the electrical conductor with insulation that can withstand the harsh conditions as well. At present, the preferred material with which to insulate the conductor 67 is PEEK®. As shown in (Prior Art) FIG. 19, this material is preferably purchased in a hollow tube 161 with an inside diameter of slightly larger than the outside diameter of the electrical conductor 67 and an outside diameter large enough to accommodate insertion of the tube into holes 69 and 70. These dimensions will vary depending upon the size of the pipe and the cable being protected.

In addition to the protection provided by an insulator like the tube of PEEK® described above, it is also preferable to apply a coating to add further protection for the electrical conductor 67. Referring to (Prior Art) FIG. 19, the coating 163 is applied to the interior 165 of the drill pipe section 11 with the conductor 67 lying on the bottom. As a result, the coating 163 flows under the influence of gravity to coat the tube 161. The coating should have good adhesion to both the steel of the pipe and the insulating material surrounding the conductor. Preferably, the coating is a polymeric material selected from the group consisting of natural or synthetic rubbers, epoxies, or urethanes. Preferably it should be in a castable form, so that it can settle by gravity around the cable. The coating can be any suitable material such as the polyurethane previously described. The amount of coating to apply can be varied, but preferably it should be applied in a thickness at least equal to that of the insulating material surrounding the shield of the coax. Most preferably, the material is poured so as to flow by gravity to cover the conductor cable. Preferably, between about one to 5 liters are used for each 30 foot pipe section. The urethane may be either air dried or heat cured by installing a heating element along the inside bore of the pipe. Curing times and temperatures will vary depending on manufacturing expediencies.

At present, the preferred method of attaching the conductor 67 to the coils 63 and 49 is soldering to form a continuous loop wire harness prior to installation into the pipe. One or more coils may then be formed at the ends of the loop without breaking into the wire harness. Although a lead/tin solder might be used, a silver solder is preferred, because of its higher melt temperature, greater mechanical strength, and greater resistance to chemical corrosion. The inner core of the coaxial cable is soldered to one end of the coil, and the outer shield to the other. Any exposed conducting surfaces should be potted with an insulating material, such as silicone rubber, epoxy, or urethane, so that the entire wire harness is insulated electrically from the environment prior to placing it in the pipe.

(Prior Art) FIG. 21 is a schematic diagram to illustrate the operation of the data transmission system of the present invention. A drilling tool 150 has housed within it a data source. The data source is designed to encode information on a high frequency alternating carrier signal on the electrical conductor 151. The conductor 151 is connected to the coils (not shown) within the MCEI element 157 at one end of the tool 150. The alternating current within the coil induces an alternating magnetic field within the MCEI element 157. That magnetic field is conducted across the joint and into the MCEI element 47 in the box end of a section of drill pipe 11. Referring to the joint in (Prior Art) FIG. 21, the two generally U-shaped elements 47 and 49 form a closed path for the magnetic flux, which circulates as shown by the arrows. The arrows reverse direction every time the current in the coils reverse direction. The magnetic field in the MCEI element 47 induces an electric current in the coil 49. The electric current induced in the coil 49 travels along the conductor 67 to the coil located in the MCEI element 27 at the pin end of the drill pipe 11, and so on.

(Prior Art) FIG. 22 shows a drill bit 181 connected to a data and crossover sub 183. The sub 183 is typically connected to the pin end of a section of drill pipe or some other downhole component. The sub 183 includes within it a data sensor module 185. In the depicted embodiment, the data sensor module 185 includes an accelerometer 195. The accelerometer is useful in gathering real time data from the bottom of the hole. For example, the accelerometer can give a quantitative measure of bit vibration.

The accelerometer 195 is connected to a circuit board 197, which generates a carrier signal and modulates it with the signal from the accelerometer. FIG. 19a is a circuit diagram of the board 197.

The circuit board 197 is connected through conductor 199 to a coil in the MCEI element 187 at the bit end of the sub. It then communicates through MCEI element 189, conductor element 191, and MCEI element 193, to the opposite end of the sub, which is adapted to connect to corresponding elements in the drill string. As such, the sub 183 is adapted to communicate with the pin end of a section of drill pipe or some other downhole component.

Many other types of data sources are important to management of a drilling operation. These include parameters such as hole temperature and pressure, salinity and pH of the drilling mud, magnetic declination and horizontal declination of the bottom-hole assembly, seismic look-ahead information about the surrounding formation, electrical resistivity of the formation, pore pressure of the formation, gamma ray characterization of the formation, and so forth. The high data rate provided by the present invention provides the opportunity for better use of this type of data and for the development of gathering and use of other types of data not presently available.

Preferably, the system will transmit data at a rate of at least 100 bits/second, more preferably, at least 20,000 bits/second, and most preferably, at least about 1,000,000 bits/second.

An advantage of the present invention is that it requires relatively low power and has a relatively high preservation of signal. Thus, the system preferably transmits data through at least 10 components powered only by the varying current supplied to one of the first conductive coils in one of the components. More preferably, the system transmits data through at least 20 components powered only by the varying current supplied to one of the first conductive coils in one of the components.

Preferably, the varying current supplied to the first conductive coil in the one component is driving a varying potential having a peak to peak value of between about 10 mV and about 20 V. Preferably, the current loss between two connected components is less than about 5 percent. Put another way, it is preferred that the power loss between two connected components is less than about 15 percent.

It is anticipated that the transmission line of the invention will typically transmit the information signal a distance of 1,000 to 2,000 feet before the signal is attenuated to the point where it will require amplification. This distance can be increased by sending a stronger signal, with attendant increased power consumption. However, many wells are drilled to depths of up to 20,000 to 30,000 feet, which would necessitate use of repeaters to refurbish the signal. Preferably, the amplifying units are provided in no more than 10 percent of the components in the string of downhole components, more preferably, no more than 5 percent.

Such repeaters can be simple "dumb" repeaters that only increase the amplitude of the signal without any other modification. A simple amplifier, however, will also amplify any noise in the signal. Although the down-hole environment is thought to be relatively free of electrical noise in the RF frequency range preferred by the invention, a "smart" repeater that detects any errors in the data stream and restores the signal, error free, while eliminating baseline noise, is preferred. Any of a number of known digital error correction schemes can be employed in a down-hole network incorporating a "smart" repeater.

Most preferably, the repeater not only serves to regenerate the data stream, but also serves as a data source itself. Prior to the present invention, information was available during drilling only from the bottom hole assembly, as mud pulse data rates did not allow any intermediate nodes. With the present invention, information is available from any node along the drill string, thereby enabling distributed access to information from top to bottom. For instance, instead of relying on a single bottom hole pressure measurement, a pressure profile can now be generated along the entire drill string. This could be vital in underbalanced drilling, where to speed up drilling the pressure provided by the mud is less than that of the pore pressure in the surrounding formation. Any sudden pressure pulse or "kick" could be much more rapidly anticipated.

In the most preferred embodiment of the invention, any source of information along the drill string, such as the bit sub illustrated in (Prior Art) FIG. 22, or a repeater, as described in the previous paragraph, may constitute an addressable node in a Drilling Local Area Network (DLAN). Preferably every repeater and every data sub manufactured in the world will be identified with a unique address. This address might be characterized by programming a programmable memory chip in the tool with a code having a sufficient number of bits to encompass all tools that might ever be connected to any DLAN comprising the transmission line of the present invention. This will allow tracking of licensed elements and will also allow manufacturers of down-hole tools to track the usage of their tools. To reduce network overhead, each tool, once assembled into a drill string, might be identified by a temporary address comprising fewer bits; for instance, a two-byte address (16 bits) will cover up to 256 nodes—probably sufficient for any drilling task. Aspects of any of the known network protocols, such as "Ethernet" or "Wireless Local Area Network" might be applied to such a DLAN. For example, the network might be thought of as a single "party line" shared by all participating nodes.

Although the invention provides a sufficiently broad-band signal to allow simultaneous transmission of information in each direction (full duplex), it is anticipated, because of the attenuation characteristics of the invention, that the most efficient communication will be half duplex, with a signal being sent from one end of the network to the other in one direction before a signal is sent in the opposite direction (half duplex). Alternatively, an asynchronous transmission line might be set up, with, for instance, 80% of the bandwidth reserved for upstream data and 20% for downstream commands. A control computer at the surface will relay a command down-hole requesting that an identified node send a packet of information. Each repeater examines the identifying header in the command packet. If the header matches its own address, it responds; otherwise, it simply relays the packet on down the network in the same direction. In this manner, many smart nodes can share a common transmission line. Any known scheme for collision detection or avoidance may be used to optimize access to the transmission medium.

Other types of data sources for downhole applications are inclinometers, thermocouples, gamma ray detectors, acoustic wave detectors, neutron sensors, pressure transducers, potentiometers, and strain gages.

Referring to (Prior Art) FIG. 25, at the top of the drill string, a top-hole repeater unit 217 is used to interface the DLAN with drilling control operations and with the rest of the world. Preferably the unit 217 rotates with the kelly 219 or top-hole drive and transmits its information to the drill rig by any known means of coupling rotary information to a fixed receiver. Preferably two MCEI units of the invention can be used in a transition sub, with one in a fixed position and the other rotating relative to it. A computer 225 in the rig control center acts as the DLAN server, controlling access to the DLAN transmission medium, sending control and command signals down-hole, and receiving and processing information sent up-hole. The software running the DLAN server will control access to the DLAN via identification of licensed nodes (tools) along the DLAN and will communicate this information, in encoded format, via dedicated land lines, satellite link (through an uplink such as that shown at 227), Internet, or other known means to a central server accessible from anywhere in the world. Use of the information will require two keys: one provided by the customer, to maintain his information as proprietary, and the other by the world network server, to monitor license compliance and to toll the active tools based on a given contractual formula.

One method of controlling network traffic on the DLAN is to use polled devices; that is, the devices will respond only when addressed by a bus master. If any device needs to report something without being polled, it will check the network for the absence of traffic prior to forwarding its data to the bus master. In the event of a data collision, all devices will be silent and the bus master will poll each device in turn to determine which device has important information. In a smart system, such information may be to report a catastrophic failure or to report a condition outside normal parameters.

Communications on the network are made pursuant to a network protocol. Examples of some commercial protocols are ATM, TCP/IP, Token Ring, and Ethernet. The efficiencies of the present system may require a novel protocol as well. A protocol is an established rule on what the data frame is comprised of. The data frame usually includes a frame header, a datagram, and a CRC. The body of the frame may vary depending on what type of datagram is in use, such as an IP datagram. The end of the frame is a CRC code used for error correction. The IP datagram consists of a header and IP datagram data. In an open system, more than one type of datagram is transported over the same communications channel. The header is further broken down into other information such as header information, source IP address and destination IP address, required by the protocol so that each node knows the origin and destination of each data frame. In this manner the downhole network will allow each node to communicate with the sensors and the surface equipment in order to optimize drilling parameters.

Although the primary purpose of the invention is for relaying of information, a limited amount of power can be transmitted along the transmission line. For instance, it may be desirable to have a second class of nodes distributed at intervals between the primary repeaters. The primary repeaters will be powered by batteries or by a device, such as a turbine, which extracts energy from the mud stream. The secondary nodes may incorporate low power circuits to provide local information of secondary importance, using energy from the transmission line itself. They would not constitute repeaters, since they would be in parallel with the existing transmission line. These secondary nodes may, for instance, tap a small amount of energy from the line to keep a capacitor or battery charged, so that when they are queried from the top at infrequent intervals they can send a brief packet of information at full signal strength. Using this principle, it might be possible to house a small low-power secondary node in every section of drill pipe, thereby providing a continuously distributed DLAN.

EXAMPLES

The following examples are provided by way of illustration and explanation and as such are not to be viewed as limiting the scope of the present invention.

Example 1 was carried out according to the most preferred embodiment of the present invention. In particular, Bench Test. Bench tests simulating connected pipe joints were conducted. The tests incorporated 30 sets of inductively coupled joints incorporating flexible segmented ferrite MCEI units in steel rings with recesses machined therein, each set being joined together in series by 34 feet of coaxial cable. The coupler consisted of 0.25-inch long by 0.100-inch diameter ferrite cylinders of permeability 125, having an inside diameter of about 0.05 inches, which were ground in half parallel to the cylindrical axis after infiltration with epoxy, bonding to a nylon chord substrate, and bonding into the groove in the steel. This simulated joint was used to characterize system transmission. A 2-volt peak-to-peak sinusoidal signal from a single 50-ohm, 2.5-mW power source energized the coupler of the first joint and produced a 22 mV, signal al last joint, into a 50 ohm load. Peak signal transmission was at 4.3 MHz, with a band width, at half height, of 2 MHz. The average attenuation in each pipe segment .backslash. was about 1.2 dB, corresponding to about 76% power transmission. About 70% of the attenuation was in the coaxial cable, which had a relatively small shield diameter (0.047 inches).

The carrier signal was modulated with both analog and digital signals, demonstrating that that a recoverable, low power, high frequency, 56 kilobaud signal is achievable across 1000 feet of interconnected drill pipe without the aid of an additional power boost or signal restoration.

Drilling test. XT57 tool joints, one a pin end and the other a box-end, were obtained from Grant Prideco, Houston, Tex. The joints had an outside diameter of approximately 7" and an inside diameter of 4.750 inches, and they were adapted to receive the coupling transducer by machining an annular groove measuring 0.125".times.0.200" deep, having a full radius bottom surface of 0.060", approximately in the center of the 0.500" wide external and internal secondary shoulders, respectively, of the pin and box ends. A 0.500" internal shoulder was also machined into the pin-end joint approximately 9 inches from the end opposite its secondary shoulder. The machining increased a portion of the internal diameter of the pin end to about 5.250". A 0.375 inches borehole was gun drilled through the sidewalls of the two joints, parallel to their longitudinal axis. In the pin end, the borehole commenced within the groove and exited the internal shoulder. In the box end, the borehole commenced within the groove and exited the opposite end of the joint. The two joints were welded together, simulating a full-length pipe that normally would be more than 30 feet long. The change in the internal diameter of the welded joints allowed for positioning 30 feet of coaxial cable within the joint so that the test would electrically equivalent to a full-length section of pipe.

The coupling transducer, having a nominal diameter of 4.700", comprising a grade 61 ferrite, with a permeability of about 125, obtained from Fair-Rite, was disposed within the annular grooves. The core of the coupler consisted of a segmented annular ferrite ring measuring approximately 0.100" wide by 0.050" high having a 0.050-inch diameter groove centrally located on its exposed face. The ferrite segments were attached to a substrate consisting of an epoxy impregnated nylon cord that served as a backing for the ferrite during the manufacturing process.

A coil having two loops of 22-gauge (0.025-inch diameter), enamel coated copper magnet wire, was wound within the ferrite groove and held in place with aircraft epoxy. The wire and ferrite assembly were affixed within the grooves in the steel using a thermally cured polyurethane resin. The ends of the copper wire were allowed to extend approximately 0.5 inches beyond the coupler apparatus and were soldered to the conductors of a type 1674A, coaxial cable, 34 feet long, having a characteristic impedance 50 ohms, obtained from Beldon Cable. The cable was protectively sheathed within a thermoplastic PEEK® material obtained from Zeus Products, and the length of cable was coiled within the hollow portion of the joint assembly and held in place with a polyvinyl chloride (PVC) sleeve.

A drilling test was conducted in a 100 foot well using thirty physically short, electronically full-length joints configured as described above. A seven-inch roller-cone bit sub from Reed Tool was fitted with an accelerometer, an FM modulator, and a battery power supply, which were sealed in an annular insert housed within the crossover sub connecting the drill string with the bit. The joints were assembled so that their respective transducers were concentrically aligned to within approximately 0.010" of each other. In the test the drill bit drilled a cement plug with and without the aid of a drilling fluid. A (6 V peak-to-peak sinusoidal signal (90 mW into 50 ohm) at the bit sub gave a clean 80 mV PP signal (50 ohm load) at the surface, which was 32 inductive couples and approximately 1000 electrical feet above the source signal. The two extra inductive pairs comprised a pair at the accelerometer sub and a rotary pair at the top drive. The audible portion of the accelerometer signal (below 20 kHz) produced an audio signal that enabled the ear to discriminate mud turbulence from drilling activity. It should be noted that the above description and the attached drawings are illustrative and not restrictive. Many variations of the invention will become apparent to those of skill in the art upon review of this disclosure.

The invention claimed is:
1. An inductively coupled drill pipe, comprising:
 a drill pipe comprising a pin end comprising threads, a first annular loadable shoulder posterior and adjacent to the pin end threads circumscribing the pin end, the annular loadable shoulder comprising an annular hardened groove comprising side and bottom groove walls within the first annular loadable shoulder coaxial with the shoulder;

the annular hardened groove walls having a hardness as measured on a Rockwell C scale between 0.05% and 5.0% greater than the annular loadable shoulder proximate the groove;

a magnetically conductive electrically insulating (MCEI) U-shaped annular channel comprising a generally soft magnetic material sintered from a powder composition disposed within the walls of the hardened annular groove;

an electrically conductive wire coil disposed within the U-shaped annular channel comprising a transmission end and a ground end;

the powder composition comprising iron and manganese particles having an average particle diameter and average particle distribution within the powder that reduces signal attenuation to less than fifty percent of a transmitted signal across inductively coupled MCEI U-shaped annular channels, and the transmission end and the ground end of the wire coil pass through enclosed orifices within the bottom wall of the MCEI U-shaped annular channel, the ground end being attached to the bottom wall of the annular hardened groove, and the transmission end passing through an opening in the bottom wall of the annular hardened groove and the annular shoulder and is connected to a cable running the length of the drill pipe to a wire coil within a similarly configured U-shaped annular channel within a similarly hardened annular groove in a box end second annular loadable shoulder posterior and adjacent to box threads at the opposite end of the drill pipe.

2. The inductively coupled drill pipe of claim 1, wherein the first and second annular loadable shoulders further comprise loadable annular adapters mounted on the drill pipe.

3. The inductively coupled drill pipe of claim 2, wherein the loadable annular adapters mounted on the drill pipe each comprise a hardened annular groove comprising a wall surface Rockwell hardness greater than the Rockwell hardness of the annular adapter adjacent to the annular groove wall surface.

4. The inductively coupled drill pipe of claim 1, wherein the U-shaped annular channel comprises a plurality of U-shaped channel segments.

5. The inductively coupled drill pipe of claim 4, wherein at least one U-shaped channel segment comprises two or more enclosed orifices.

6. The inductively coupled drill pipe of claim 4, wherein one end of the wire coil passes through the enclosed orifice of the U-shaped channel segment to ground while the other end passes through another enclosed orifice to the cable.

7. The inductively coupled drill pipe of claim 4, wherein the U-shaped channel segments provide a gap free U-shaped annular channel.

8. The inductively coupled drill pipe of claim 1, wherein the powder composition comprises one or more of oxygen and transition metals on the Periodic Table or a combination thereof.

9. The inductively coupled drill pipe of claim 1, wherein the powder composition comprises one or more of magnesium, calcium, beryllium, or a combination thereof.

10. The inductively coupled drill pipe of claim 1, wherein the powder composition comprising iron and manganese particles has an average particle diameter of between 350 µm and 1250 µm.

11. The inductively coupled drill pipe of claim 1, wherein the powder composition comprising iron and manganese particles has an average particle diameter of between 600 nm and 900 nm.

12. The inductively coupled drill pipe of claim 1, wherein the average iron and manganese particle distribution within the powder composition is about between 8:2 and 2:8, respectively.

13. The inductively coupled drill pipe of claim 1, further comprising a wall region of the annular hardened groove comprises a Rockwell hardness greater than the Rockwell hardness of the annular loadable shoulder adjacent the wall region.

14. The inductively coupled drill pipe of claim 1, wherein the annular hardened groove further comprises an annular insert mounted within the annular shoulder comprising a Rockwell hardness greater than the Rockwell hardness of the annular shoulder adjacent the insert.

15. The inductively coupled drill pipe of claim 1, wherein the annular hardened groove comprises deformed wall surfaces.

16. The inductively coupled drill pipe of claim 15, wherein the annular hardened groove comprises a hardened region extending from the deformed wall surfaces into the annular shoulder a distance of about between 0.001 mm to about 3 mm.

17. The inductively coupled drill pipe of claim 15, wherein the deformed wall surfaces of the hardened annular groove comprise indentations.

18. The inductively coupled drill pipe of claim 15, wherein the deformed wall surfaces of the hardened annular groove comprise indentations produced by means of peening, shot peening, hammer peening, laser peening, ultrasonic peening, grit peening, glass peening, or a combination thereof.

19. The inductively coupled drill pipe of claim 1, wherein at least one enclosed orifice provides a means for locating the U-shaped annular channel within the hardened groove.

20. The inductively coupled drill pipe of claim 1, wherein at least one enclosed orifice provides a means for securing the U-shaped annular channel within the hardened groove.

* * * * *